(12) United States Patent
Chen et al.

(10) Patent No.: US 8,368,314 B2
(45) Date of Patent: Feb. 5, 2013

(54) CHARGE PUMP ELECTRONIC BALLAST FOR USE WITH LOW INPUT VOLTAGE

(75) Inventors: Wei Chen, Guangdong (CN); Shu Dong Li, Guangdong (CN)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 410 days.

(21) Appl. No.: 12/528,450

(22) PCT Filed: Jan. 28, 2008

(86) PCT No.: PCT/EP2008/050945
§ 371 (c)(1),
(2), (4) Date: Aug. 25, 2009

(87) PCT Pub. No.: WO2008/101764
PCT Pub. Date: Aug. 28, 2008

(65) Prior Publication Data
US 2011/0006700 A1    Jan. 13, 2011

(30) Foreign Application Priority Data
Feb. 25, 2007   (CN) .......................... 2007 1 0005804

(51) Int. Cl.
*H05B 37/02* (2006.01)
(52) U.S. Cl. ......... 315/224; 315/247; 315/291; 315/307
(58) Field of Classification Search .......... 315/224–225, 315/244, 247, 209 R, 291, 307–308, 219, 315/194, DIG. 7, DIG. 4
See application file for complete search history.

(56) References Cited

U.S. PATENT DOCUMENTS

| | | | |
|---|---|---|---|
| 4,398,126 A | 8/1983 | Zuchtriegel | |
| 5,400,241 A | 3/1995 | Bergervoet | |
| 5,955,841 A | 9/1999 | Moisin et al. | |
| 6,034,489 A | 3/2000 | Weng | |
| 6,198,231 B1 | 3/2001 | Schemmel et al. | |
| 6,316,883 B1 * | 11/2001 | Cho et al. | 315/247 |
| 6,603,274 B2 * | 8/2003 | Ribarich et al. | 315/291 |
| 6,642,670 B2 * | 11/2003 | Zhang et al. | 315/247 |
| 7,061,781 B2 * | 6/2006 | Heckmann et al. | 363/81 |
| 7,154,227 B2 * | 12/2006 | Heckmann | 315/194 |
| 7,626,344 B2 * | 12/2009 | Alexandrov | 315/291 |
| 2002/0140373 A1 | 10/2002 | Ribarich et al. | |

FOREIGN PATENT DOCUMENTS

| | | |
|---|---|---|
| DE | 3503778 C2 | 11/1986 |
| DE | 4425823 A1 | 1/1996 |
| JP | 1023761 A | 1/1989 |
| JP | 6215885 A | 8/1994 |
| JP | 10271831 A | 10/1998 |

OTHER PUBLICATIONS

English language abstract for DE 3503778C2, Aug. 7, 1986.
International Search Report of PCT/EP2008/050945 mailed Jun. 5, 2009.
English language abstract for DE 4425823A1, Jan. 11, 1996.
English Abstract of JP1023761 A. Jan. 26, 1989.
English Abstract of JP10271831 A. Oct. 9, 1998.

* cited by examiner

Primary Examiner — James H Cho

(57) ABSTRACT

A charge pump electronic ballast for use with low input voltage is described. The charge pump electronic ballast includes a DC/AC inverter circuit having two switching transistors, a resonant circuit having an inductor and a capacitor. The charge pump electronic ballast further includes a voltage multiplying rectifying circuit for transforming low input AC voltage into high output DC voltage, and a charge pump circuit having an inductor and a first pump capacitor.

7 Claims, 2 Drawing Sheets

PRIOR ART

CHARGE PUMP ELECTRONIC BALLAST FOR USE WITH LOW INPUT VOLTAGE

RELATED APPLICATIONS

The present application is a national stage entry according to 35 U.S.C. §371 of PCT application No.: PCT/EP2008/050945 filed on Jan. 28, 2008, which claims priority from Chinese application No.: 200710005804.0 filed on Feb. 25, 2007.

TECHNICAL FIELD

The present invention relates to a charge pump electronic ballast.

BACKGROUND

In recent years, the electronic ballast using charging capacitor and high frequency AC source for power factor correction (PFC) has become a very attractive circuit topology. The charging capacitor adjusts the waveform of the input current in a way similar to a "charge pump", so such kind of circuit is also called "charge pump" power factor regulator. FIG. 1 shows a typical charge pump electronic ballast circuit. The charge pump electronic ballast comprises a bridge rectifying circuit, a charge pump circuit composed of a pump capacitor Cin, a diode Dc and an energy storage capacitor CB, a DC/AC inverter circuit composed of transistors Q1 and Q2, a resonant circuit composed of an inductor Lr1 and a capacitor Cr1, and a DC blocking capacitor Cb1.

Said charge pump electronic ballast is usually designed with respect to the input voltage of 220V-240V, but when the input voltage is 220V-240V, there is a high voltage stress during the ignition of a lamp.

In some cases of application, however, the input voltage, i.e. the output voltage of the AC source is usually a low voltage such as 127V, so there is a need for a charge pump electronic ballast circuit for use with low input voltage, which could solve the problem of high voltage stress and is cost-effective and simple.

SUMMARY

The aim of the present invention is to provide a simple charge pump electronic ballast for use with low input voltage.

According to one embodiment of the present invention, a charge pump electronic ballast for use with low input voltage is provided. Said charge pump electronic ballast comprises a DC/AC inverter circuit composed of two switching transistors, a resonant circuit composed of a resonant inductor and a resonant capacitor, and further comprises a voltage multiplying rectifying circuit for transforming low input AC voltage into high output DC voltage, and a charge pump circuit composed of an inductor and a first pump capacitor.

In a preferred embodiment, one terminal of said first pump capacitor is coupled to a first input of the voltage multiplying rectifying circuit and is coupled to an output of the AC power supply via the inductor of said charge pump circuit, and the other terminal of said first pump capacitor is coupled to said resonant capacitor via a lamp, with a second input of the voltage multiplying rectifying circuit being coupled to the other output of said AC power supply.

In a preferred embodiment, said voltage multiplying rectifying circuit is a voltage doubling rectifying circuit composed of two diodes and two capacitors.

In a preferred embodiment, the connection point of said two diodes is the first input of said voltage multiplying rectifying circuit, the connection point of said two capacitors is the second input of said voltage multiplying rectifying circuit, and two terminals of the parallel circuit composed of a first half-bridge including said two diodes and a second half-bridge including said two capacitors are the outputs of said voltage multiplying rectifying circuit.

In a preferred embodiment, said charge pump electronic ballast further comprises a shutdown protection circuit which has a thyristor.

In a preferred embodiment, said charge pump electronic ballast further comprises a first resistor having one terminal coupled to said other terminal of the first pump capacitor and the other terminal coupled to the anode of the thyristor, and it further comprises a second resistor having one terminal coupled to said other terminal of the first pump capacitor and the other terminal coupled to a output of the voltage multiplying rectifying circuit.

In a preferred embodiment, a third diode and a fourth diode are provided to be coupled between the first half-bridge and the outputs of the voltage multiplying rectifying circuit respectively, wherein said third diode and fourth diode and the two diodes of the first half-bridge are in series aiding connection, and said charge pump electronic ballast further comprises a second pump capacitor having one terminal coupled to said other terminal of the first pump capacitor and having the other terminal coupled to the connection point of the first half-bridge and the fourth diode.

DESCRIPTION OF THE FIGURES

The present invention will be illustrated in detail below with reference to the figures, wherein.

DETAILED DESCRIPTION

The present invention will be described in detail by means of embodiments in conjunction with the figures.

Figure 1:
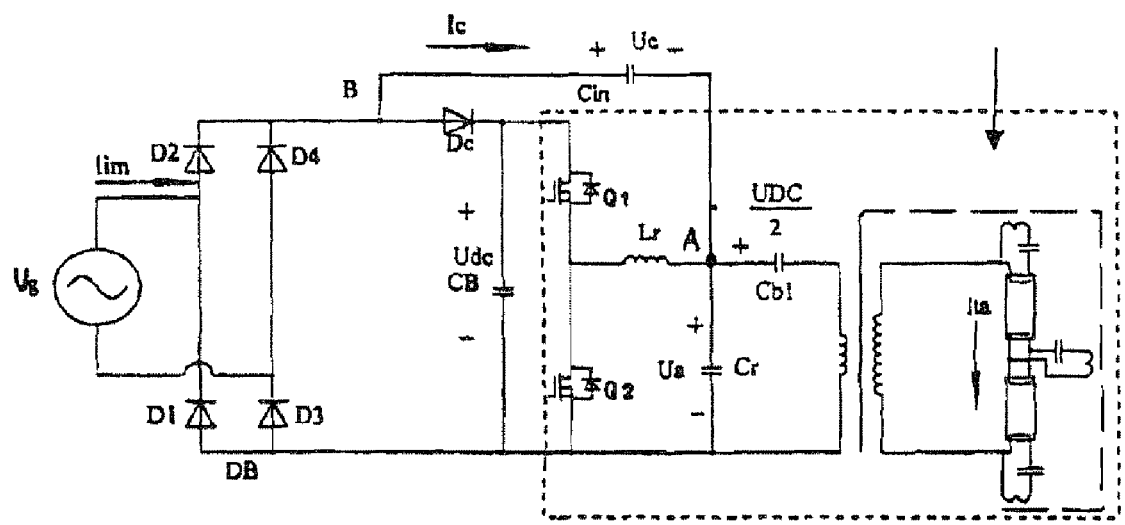
FIG. 1 shows the typical charge pump electronic ballast circuit in the prior art.
Figure 2:
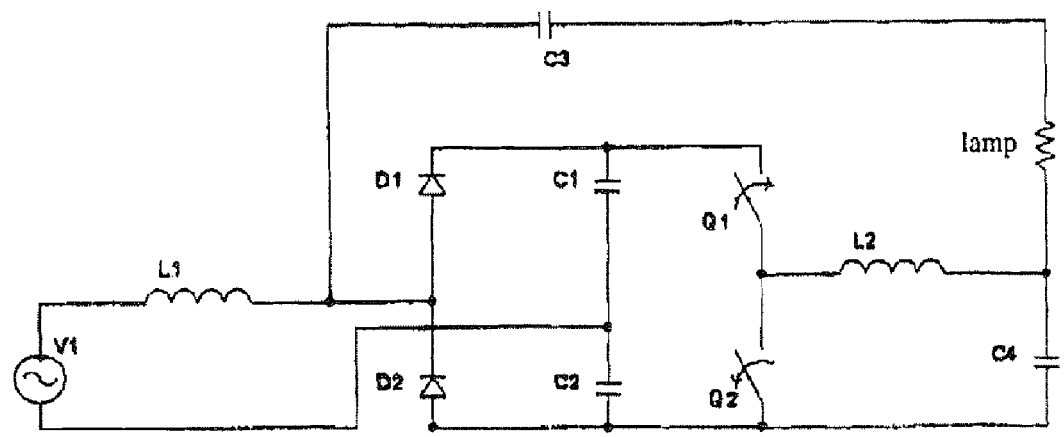
FIG. 2 shows the basic equivalent circuit of a charge pump electronic ballast according to the present invention.

FIG. 2 shows the basic equivalent circuit of a charge pump electronic ballast according to the present invention. Said charge pump electronic ballast comprises a DC/AC inverter circuit composed of switching transistors Q1 and Q2, a resonant circuit composed of a resonant inductor L2 and a resonant capacitor C4, and further comprises a voltage multiplying rectifying circuit composed of diodes D1 and D2 and capacitors C1 and C2, and a charge pump circuit composed of an inductor L1 and a pump capacitor C3. Said voltage multiplying rectifying circuit is used for transforming the input low AC voltage into DC voltage with doubled voltage value, that is, it increases the bus voltage ($V_{bus}=V_{c1}+V_{c2}$). Said pump capacitor C3 is coupled to the resonant capacitor C4 via a lamp (or lamps).

Such a circuit structure avoids the high voltage stress in the bus during the ignition period, because if the lamp is not ignited, the charge pump circuit does not work at all, while after the lamp has been ignited, the resonant capacitor C4 will be a high frequency AC source to implement the power factor correction together with the pump capacitor C3.

When the input voltage is 127V and the input power is 35.4 W, ideal experimental results are obtained by using the charge pump electronic ballast according to the present invention, i.e. PF (Power Factor)=0.96, THD (Total Harmonic Distortion)=6.5%, $I_{lamp\ rms}$=295.3 mA, CF (Crest Ratio)=1.6, and $V_{bus}$=385V.

Figure 3:
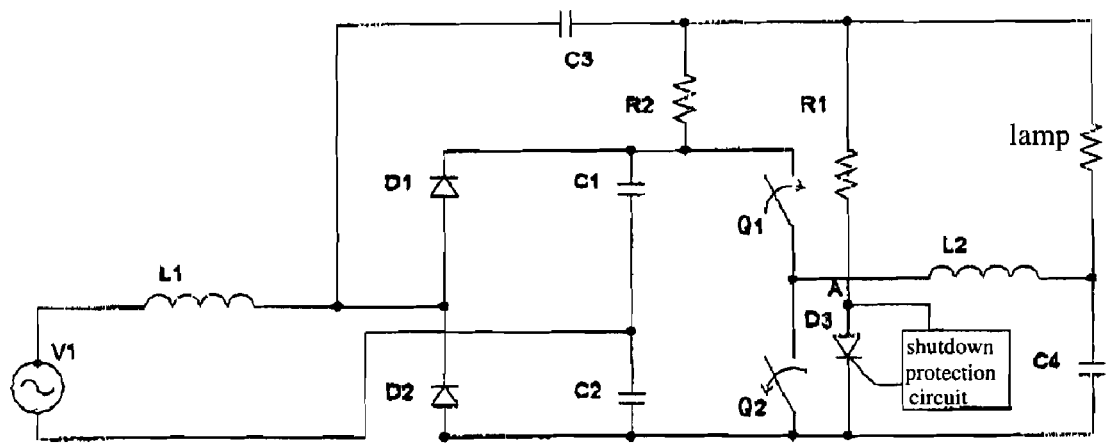
FIG. 3 shows the equivalent circuit of a charge pump electronic ballast having a shutdown protection circuit according to the present invention.

FIG. 3 shows the equivalent circuit of a charge pump electronic ballast having a shutdown protection circuit according to the present invention. A shutdown protection circuit is provided in said circuit, which comprises a thyristor D3.

Currently, many popular ballasts are provided with shutdown protection circuits, most of which use thyristor as the core component. In this circumstance, the ballast circuit has to provide enough holding current for the thyristor to maintain the shutdown protection circuit, because when the thyristor is switched on, if the main loop current, i.e. the holding current decreases to be close to zero, the thyristor will be switched off, and the shutdown protection circuit will be released.

In the charge pump electronic ballast as shown in FIG. 3, when the thyristor D3 is switched on, the half-bridge switch will be switched off and the voltage of the point A will be pulled down to be close to zero. For maintaining the shutdown protection circuit, enough holding current of thyristor D3 is necessary.

In the charge pump electronic ballast of the present invention, a large pump capacitor C3 is used to obtain better performance of the charge pump electronic ballast. But on the other hand, the pump capacitor C3 has a great influence on the holding current. The larger the pump capacitor C3 is, the larger the obtained modulated current becomes. If such modulated current is large enough to pull the holding current of thyristor D3 down to zero, the thyristor will be switched off and the shutdown protection circuit will be open.

Figure 4:
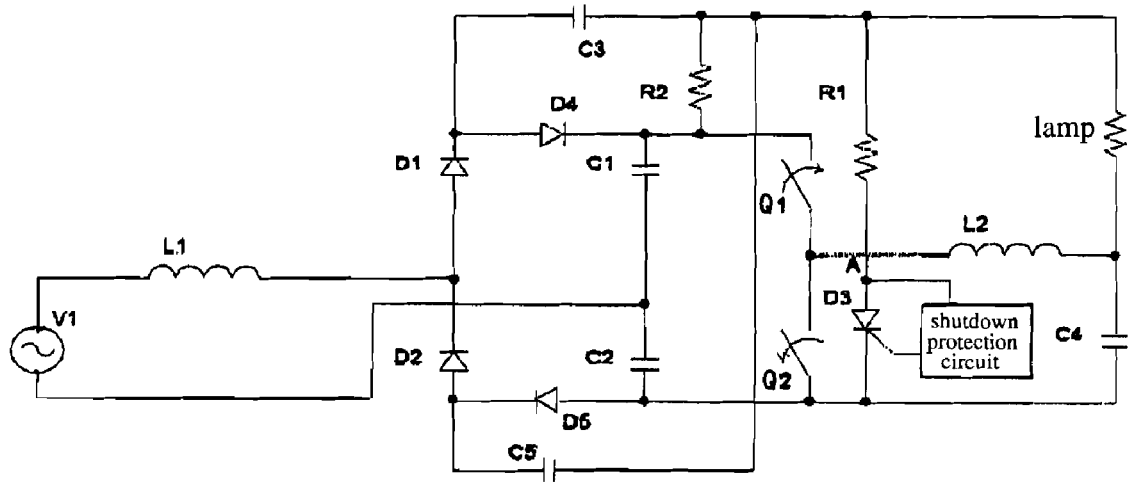
FIG. 4 shows the equivalent circuit of an improved charge pump electronic ballast having a shutdown protection circuit according to the present invention.

Therefore, in order to solve this problem, an improved charge pump electronic ballast having a shutdown protection circuit according to the present invention is provided as shown in FIG. 4. In said improved charge pump electronic ballast, another pump capacitor C5 is provided and two additional diodes D4 and D6 are provided in the voltage multiplying rectifying circuit. Such a charge pump electronic ballast using two pump capacitors C3 and C5 can not only achieve good power factor correction, but also provide enough holding current to the thyristor to maintain the shutdown protection circuit.

While the present invention has been described with reference to various illustrative embodiments thereof, the present invention is not intended that the invention be limited to these specific embodiments. Those skilled in the art will recognize that variations, modifications, and combinations of the disclosed subject matter can be made without departing from the spirit and scope of the invention as set forth in the appended claims.

What is claimed is:

1. A charge pump electronic ballast for use with low input voltage, the charge pump electronic ballast comprising:

a DC/AC inverter circuit comprising two switching transistors;

a resonant circuit composed of a resonant inductor and a resonant capacitor;

a voltage multiplying rectifying circuit for transforming low input AC voltage into a high output DC voltage; and a charge pump circuit comprising an inductor and a first pump capacitor wherein a current does not charge the first pump capacitor prior to ignition of the lamp.

2. The charge pump electronic ballast according to claim 1, wherein the one terminal of said first pump capacitor is coupled to a first input of the voltage multiplying rectifying circuit and is coupled to an output of an AC power supply via the inductor of said charge pump circuit, the other terminal of said first pump capacitor is coupled to said resonant capacitor via a lamp, and a second input of the voltage multiplying rectifying circuit is coupled to the other output of said AC power supply.

3. The charge pump electronic ballast according to claim 2, wherein said voltage multiplying rectifying circuit comprises a voltage doubling rectifying circuit comprising two diodes and two capacitors.

4. The charge pump electronic ballast according to claim 3, wherein the connection point of said two diodes is the first input of said voltage multiplying rectifying circuit, the connection point of said two capacitors is the second input of said voltage multiplying rectifying circuit, and two terminals of a parallel circuit comprising a first half-bridge including said two diodes and a second half-bridge including said two capacitors are outputs of said voltage multiplying rectifying circuit.

5. The charge pump electronic ballast according to claim 4, wherein said charge pump electronic ballast further comprises a shutdown protection circuit comprising a thyristor.

6. The charge pump electronic ballast according to claim 5, wherein said charge pump electronic ballast further comprises: a first resistor, wherein the one terminal of the first resistor is coupled to said other terminal of the first pump capacitor and the other terminal of the first resistor is coupled to the anode of the thyristor; and a second resistor, wherein the one terminal of the second resistor is coupled to said other terminal of the first pump capacitor and the other terminal of the second resistor is coupled to a output of the voltage multiplying rectifying circuit.

7. The charge pump electronic ballast according to claim 6, wherein the charge pump electronic ballast further comprises: a third diode; a fourth diode, wherein said third diode and said fourth diode are coupled between the first half-bridge and the outputs of the voltage multiplying rectifying circuit respectively, and said third diode, said fourth diode, and the two diodes of the first half-bridge are in a series aiding connection; and a second pump capacitor wherein the one terminal of the second pump capacitor is coupled to said other terminal of the first pump capacitor and the other terminal of the second pump capacitor is coupled to the connection point of the first half-bridge and the fourth diode.

* * * * *